United States Patent [19]

Commissaire et al.

[11] Patent Number: 5,070,334
[45] Date of Patent: Dec. 3, 1991

[54] METHOD AND DEVICE FOR ASSISTING TERRESTRIAL VEHICLE TRAFFIC

[75] Inventors: Henri Commissaire, Elancourt; Pierre Pathier, Bievres; Jacques Sirven, Versailles, all of France

[73] Assignee: Electronique Serge Dassault, Saint-Cloud, France

[21] Appl. No.: 490,308

[22] Filed: Mar. 8, 1990

[30] Foreign Application Priority Data

Mar. 21, 1989 [FR] France ................ 89 03700

[51] Int. Cl.$^5$ ............................................. G01S 13/80
[52] U.S. Cl. ...................................... 342/43; 342/125
[58] Field of Search ..................... 342/51, 42–44, 342/125

[56] References Cited

U.S. PATENT DOCUMENTS 2,837,736 6/1958 Golay .
4,015,259 3/1977 Siverhus et al. .
4,242,661 12/1980 Henoch et al. .
4,278,977 7/1981 Nossen .
4,390,880 6/1983 Henoch .
4,804,961 2/1989 Hane .

FOREIGN PATENT DOCUMENTS 2746776 4/1979 Fed. Rep. of Germany .
2248517 5/1975 France .
2353863 12/1977 France .
 256294 10/1985 France .

OTHER PUBLICATIONS

IEEE, "Automatic Vehicle Identification Technology and Applications", pp. 285–291, May 1985.

Primary Examiner—Mark Hellner
Attorney, Agent, or Firm—Dennison, Meserole, Pollack & Scheiner

[57] ABSTRACT

A method for assisting terrestrial vehicle traffic involves equipping at least some vehicles with a radar system and a transponder capable of re-transmitting with selected frequency transposition any radar wave received within a predetermined frequency band. The radar system semi-continuously transmits the waves capable of measuring a distance over a range of several hundreds of meter, and the radar system receives the transposed echoes in order to carry out distance measurement thereon. It is also possible to provide certain bodies, not equipped with radar, with individual transponders which are different from those provided on vehicles.

31 Claims, 6 Drawing Sheets

METHOD AND DEVICE FOR ASSISTING TERRESTRIAL VEHICLE TRAFFIC

FIELD OF THE INVENTION

The invention relates to terrestrial vehicle traffic.

BACKGROUND OF THE INVENTION

There is no need to point out here the number and gravity of traffic accidents. For years, a system which is simultaneously reliable, effective and not excessively restrictive, and which allows the risk of collisions between vehicles and, more generally, the number of traffic accidents to be reduced has been sought.

At a very early stage, the use of radar on vehicles for anti-collision purposes was contemplated. One example is the subject described in the journal Electronics, February 1974, entitled "Radar in auto on collision course tightens passengers seat belts". Reading of this document reveals the difficulties of the problem.

These difficulties are fundamental with regard to road traffic as the bodies which are likely to meet one another (in collision) can be driven into extremely varied positions and with extremely varied speed vectors (allowing for both direction and amplitude). Reliable and exhaustive details therefore have to be acquired, but in a sufficiently limited number, on situations likely to cause a collision.

In this particular case, certain stationary objects can be just as important as moving objects.

The radar therefore has to recognize the stationary and moving objects which it detects, from their "radar signature". This problem has not yet been solved.

Moreover, the main risk of collision is linked to objects moving at slow speed, transversely to the direction of observation. Now, as the radial speed of such objects is almost zero, it is difficult for radar to distinguish them from stationary objects.

Furthermore, any application of radar is characterised by a "proportion of false alarms". If this proportion is kept very low, dangerous situations will not be indicated to the vehicle driver. Conversely, if it is too high, the driver will lose confidence in the radar which is assisting him.

The search for a satisfactory compromise is therefore extremely awkward in view of the variety of potential collision situations.

Up until now, virtually no commercial solutions have come to light or been highly developed owing to the complexity of the problem.

The object of the present invention is, in particular, to advance the technique toward a solution by proposing means which are much better adapted to the detection of situations likely to cause a collision.

SUMMARY OF THE INVENTION

According to a general definition of the invention, at least some vehicles are equipped with a transponder capable of re-transmitting, with selected frequency transposition, any radar wave received in a predetermined frequency band, and the radar system semi-continuously transmits waves capable of measuring a distance (advantageously by their phase angle) over a range of several hundred of meters, while it receives the transposed echoes and measures the distance thereon.

Each transponder preferably re-transmits in a semi-continuous fashion Moreover, with regard to at least one category of bodies not equipped with radar, it is proposed that at least some of these bodies be equipped with individual transponders which are different from those provided on said vehicles and are specific to this category. In this case, each category of bodies is allocated a specific nominal transposition frequency.

It is very advantageous if at least some of the transponders are capable of encoding the waves which they retransmit and the radar system decodes the waves thus received from the transponders.

According to a first embodiment of the invention, the radar system transmits a carrier wave modulated by phase inversion according to a pseudo-random code selectively allocated to the vehicle and carries out, on the echoes, compensation of the transposition or transpositions, followed by correlation with said pseudo-random code to allow measurement of distance.

According to a second embodiment of the invention, the radar system simultaneously transmits two adjacent carrier waves selectively allocated to the radar system and, on the echoes, measures the phase deviation between the carrier waves received to allow measurement of distance.

The invention also relates to devices for carrying out the invention, that is both the interrogator and the transponder.

Further characteristics and advantages of the invention will appear on reading the following detailed description and the accompanying drawings.

DETAILED DESCRIPTION OF THE PREFERRED EMBODIMENTS

Figure 1:
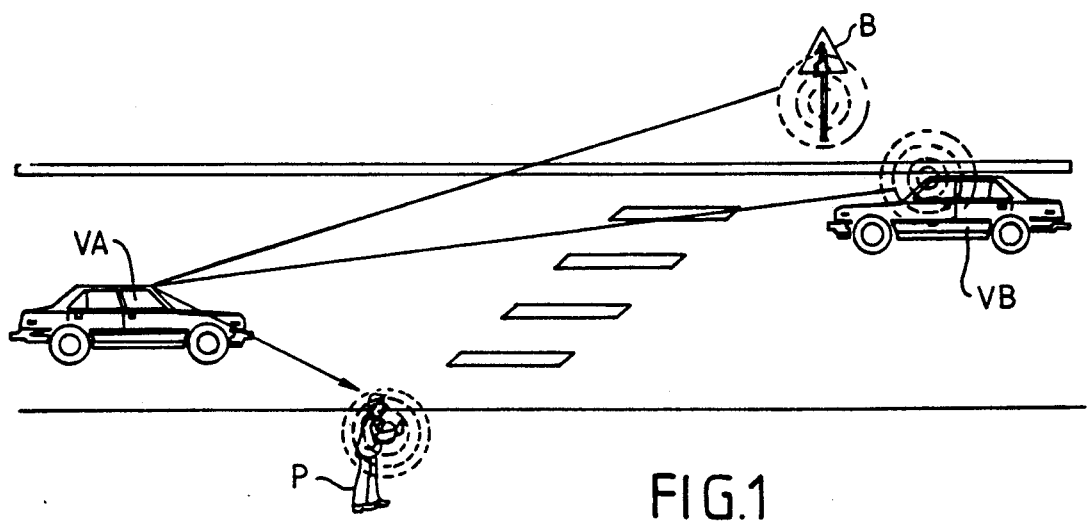
FIG. 1 shows schematically a traffic situation involving two vehicles, a pedestrian and a beacon

In FIG. 1, the references VA and VB each designate two vehicles travelling in opposite directions on a road.

On one of the verges of the road, a pedestrian P is just about to cross the road at a pedestrian crossing point. On the other verge of the road, a beacon B indicates said pedestrian crossing.

As their relative positions change, the bodies VA, VB, P and B can come into a potential collision situation. This is what the invention aims to detect.

Figure 2:
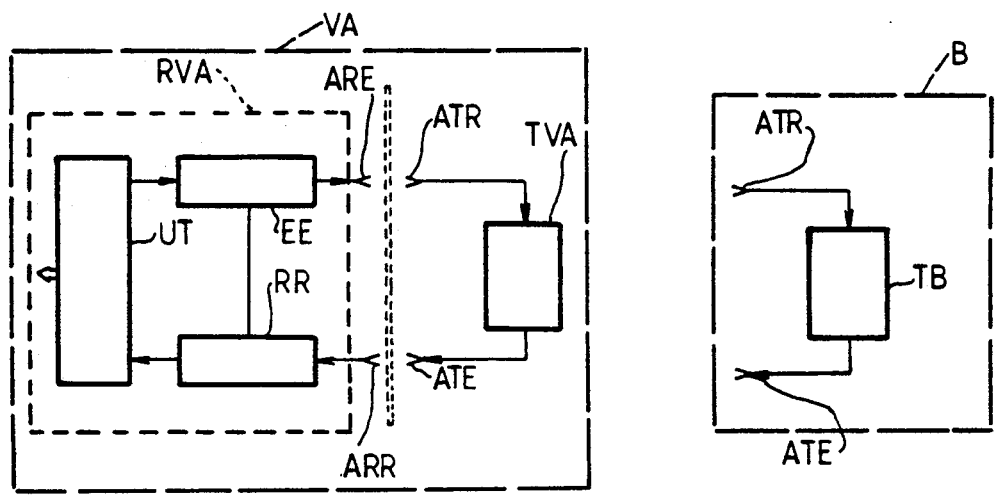
FIG. 2 shows schematically the bodies in FIG. 1 equipped with radar and/or transponders according to the invention.
Figure 2:
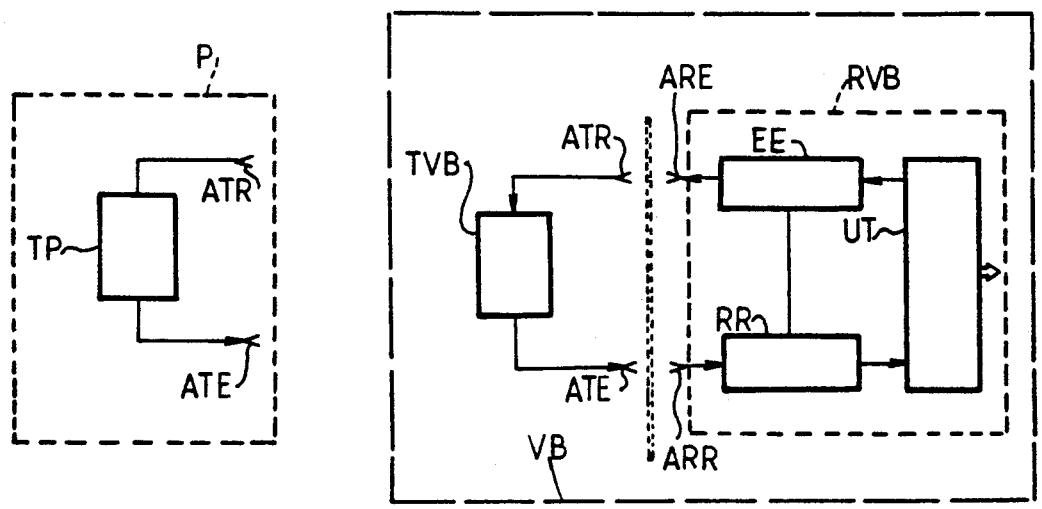

Reference will now be made to FIG. 2. It is proposed that the vehicles VA and VB each be equipped with on-board radar RVA and RVB as well as a wideband transponder TVA and TVB.

First of all, the radar systems RVA and RVB interrogate the space surrounding them by each semi-continuously transmitting waves which will serve to measure a distance over a range of several hundreds of meters.

The transponder TVB then transposes the frequency of the radar waves received from the vehicle VA Similarly, the transponder TVA transposes the frequency of the radar waves received from the vehicle VB.

Finally, the radar systems receive the transposed echoes and measure the distance thereon.

The radar systems RVA and RVB each comprise transmission means ARE, receiving means ARR, a transmitter module EE, a receiver module RR and a processing unit UT.

The transponders TVA and TVB each comprise transmission means ATE, receiving means ATR and a re-transmitter with frequency transposition.

The semi-continuity of radar transmission nor only allows the use of the radar to be reduced but also provides, in particular, the beginning of a solution to the problem of saturation of the radar in the presence of active transponders.

In fact, a person skilled in the art will easily understand that a semi-continuously transmitting radar is less subject to saturation than a continuously operating radar system, in the presence of a large number of other interrogators and transponders.

To help solve the problem of radar saturation, each transponder also re-transmits almost semi-continuously.

The device also prevents collisions between vehicles and pedestrians and/or roadside fixtures but this problem is almost insoluble with state of the art radar systems. For this purpose, certain categories of objects not equipped with radar are provided with an individual transponder which is preferably different from those in vehicles.

More specifically, the pedestrian P is equipped with a transponder TP, for example, housed in a watch strap.

Certain roadside fixtures can also be equipped with transponders to indicate a particular obstacle such as a level crossing, a pedestrian crossing or a dangerous bend. For example, a transponder is mounted on the beacon B indicating the pedestrian crossing.

The transponders thus allow several categories of object to be distinguished, in particular by the fact that they utilise different transposition frequencies. Furthermore, the problems of possible saturation are thus distinct for the different categories of objects. Hereinafter it will be assumed that two different transposition frequencies are used, although three transposition frequencies would be preferable (vehicles, pedestrians, beacons).

There are numerous radar techniques which are capable of measuring a distance.

The radar system provided in the vehicles according to the invention preferably utilises one of the following techniques:
transmission of a carrier wave modulated according to a pseudo-random code, or
simultaneous transmission of two slightly spaced frequencies.

Figure 3:
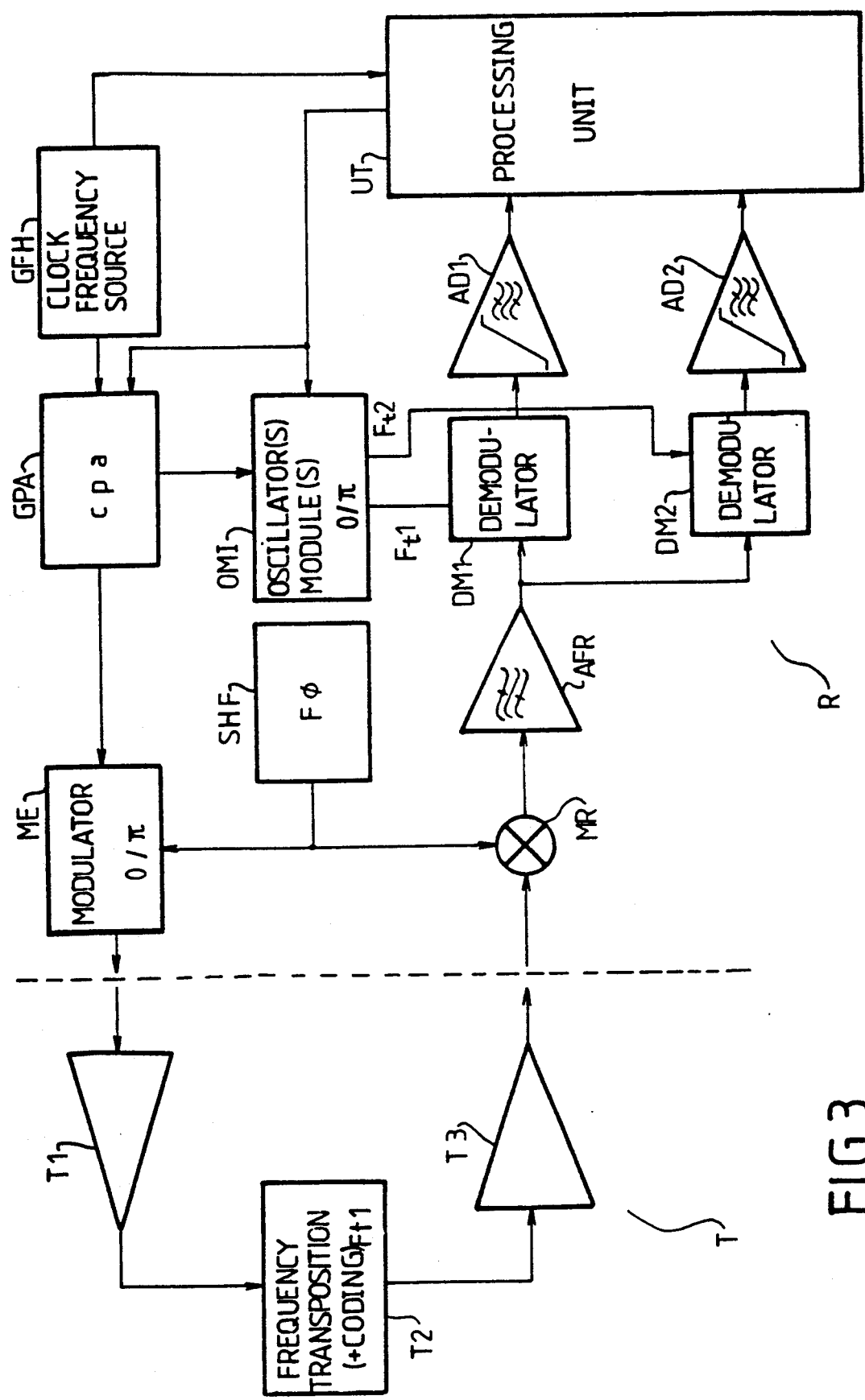
FIG. 3 shows schematically the first embodiment of the device according to the invention.

FIG. 3 shows a radar system having a carrier wave modulated according to a pseudo random code A frequency and clock source GFH creates, from the same time reference, clocks which can be used in the different digital circuits of the radar and frequency values which may be used in analogue form. This source GFH gives rhythm to the clock of a pseudo-random code generator GPA which delivers at its output a pseudo-random code cpa specific to the radar system This code has a period Fcpa to which a repetition frequency or rate Fcpa is allocated. The rhythm of the code clock is designated Fm.

A generator SFH generates a basic hyperfrequency $F\emptyset$ of the order of 1 gigahertz.

This frequency $F\emptyset$ is applied to a modulator ME which modulates the basic frequency $F\emptyset$ by phase inversion according to the successive bits of the pseudo-random code cpa received by the modulator ME The carrier wave based on the frequency $F\emptyset$, which is thus modulated by the code cpa, is transmitted by the radar system R.

The clock frequency Fm of the pseudo-random generator GPA is of the order of 7.5 megahertz. Thus, the radar transmission spectrum is of the order of $F\emptyset \pm 7.5$ megahertz.

The carrier wave transmitted in this way by the radar system R is received by a transponder T provided on another vehicle or on a pedestrian or a beacon.

Amplification means T1 amplify the signal thus received by an antenna (not shown).

A frequency transposing re-transmitter T2 connected to the amplification means T1 transposes the frequency of the signal amplified by T1.

The transponder T finally re-transmits the transposed signal via the amplification means T3 connected to the re-transmitter T2.

Frequency transposition can be carried out by single-sideband modulation, allowing simple, compact and inexpensive transponders to be produced.

The transposition frequency of the transponders is specific to the category of bodies carrying such transponders.

For example, the transponders carried by pedestrians have a transposition frequency $Ft_1$ of the order of 15 megahertz whereas the transponders carried by vehicles have a transposition frequency of the order of 30 megahertz.

The frequency transposing re-transmitter can re-transmit semi-continuously, for example according to a formal ratio of 1/10, that is to say the re-transmitter is active for only 10% of its time.

The peak power of the re-transmitter provided on vehicles can be higher than or equal to 10 mW and that of the re-transmitters provided for pedestrians can be higher than or equal to 0.1 mW.

The operating band of the transponder is in the gigahertz region, with a bandwidth of at least 10 megahertz approximately.

The sound factor of the transponder is of the order of 10 decibels.

On reception, the on-board radar system of the vehicle receives, via an antenna (not shown), any echoes which will theoretically be at a frequency $F\emptyset + Ft_1$ modulated by the code cpa to the frequency Fcpa, $Ft_1$ designating a transposition frequency value of a transponder.

In the first instance, a mixer MR receiving $F\emptyset$ as local signal will supply to its output a frequency of the form $Ft_1$ modulated to the frequency Fcpa, and other lines which will be filtered by filtration means AFR of the linear amplifier type. The filtration means AFR supply an intermediate frequency FI representative of the transposition frequency modulated by a pseudo-random code of frequency Fcpa.

An oscillator OMI, modulated by phase inversion according to the pseudo-random code, produces a distance demodulation signal having transposition frequencies such as $Ft_1$ and $Ft_2$ which are allocated respectively to pedestrians and vehicles.

The outputs of the oscillator OMI will therefore be local signals of the form $Ft_1$ modulated to the frequency Fcpa, and $Ft_2$ modulated to the frequency Fcpa respectively.

A demodulator DM1 allocated to the transposition frequency $Ft_1$ demodulates the echoes into intermediate frequency by means of a local distance demodulation signal $Ft_1$ modulated to the frequency Fcpa produced by the oscillator OMI.

A demodulator DM2 allocated to the transposition frequency $Ft_2$ demodulates the echoes into intermediate frequency by means of a local distance demodulation signal $Ft_2$ modulated to the frequency Fcpa produced by the oscillator OMI.

Filtration means AD1 and AD2 of the limiting amplifier type filter the signals demodulated by DM1 and DM2 respectively.

After this, the signals demodulated and filtered in this way are received by a processing unit UT which shifts the pseudo-random code cpa until a predetermined phase relationship is obtained after the second demodulation.

This that this shifting of the pseudo-random code depends essentially on the distance. However, it is measured by a signal which is affected by the Doppler effect and by the transposition frequency distribution of the transponders.

The invention ignores the Doppler effect. The filters AD1 and AD2 can have a bandwidth of 7.5 kHz and this amply covers the above-mentioned deviations. Under these circumstances, it is not necessary to acquire the carrier frequency residue before demodulation of the pseudo-random code.

Next, the processing unit processes the shift so as to gauge it and to digitalise it. Finally, the processing unit informs the driver about the various bodies, vehicles, pedestrians, beacons which can constitute obstacles or cause a collision.

Figure 4A:
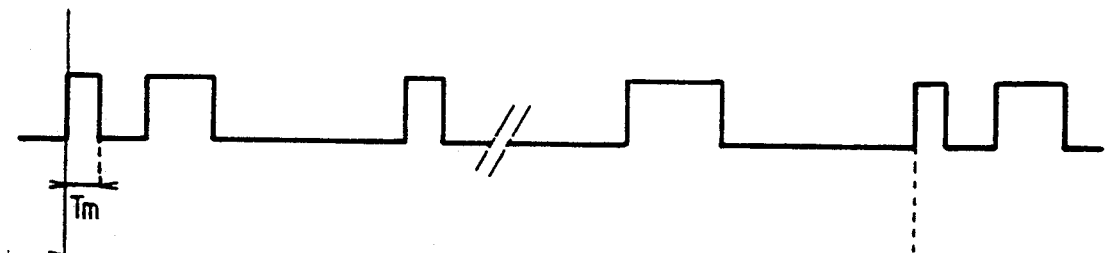
FIG. 4a, 4b and 4c shows a chronogram illustrating the radar signals in the first embodiment of the device according to the invention.
Figure 4B:
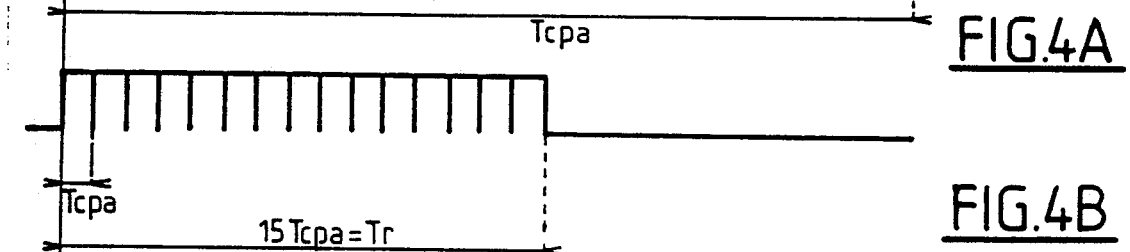
Figure 4C:
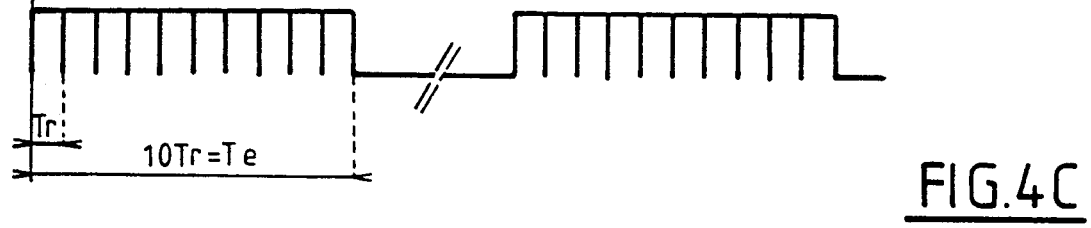

Reference will now be made to FIG. 4, which shows chronograms illustrating the pseudo-random code.

Part A of FIG. 4 shows the chronogram of a pseudo-random code according to the invention.

The chronogram comprises a succession (or package) of bits having, for example, a elementary duration Tm of 0.133 microseconds each, with an overall periodicity of 1000 bits extending over a duration Tcpa equal to 133 microseconds. A modulation spectrum of ±7.5 MHz (1/0.133 microseconds) follows.

Part B of FIG. 4 shows a chronogram illustrating 15 consecutive periods of the pseudo-random code having an individual duration Tcpa of 133 microseconds. These 15 periods have an overall duration Tr of 2 ms.

Part C of FIG. 4 shows a chronogram illustrating a transmission segment comprising 150 periods of the pseudo-random code, that is 10 cycles of 2 ms.

The formal factor of the transponders being 1/10 (they respond for 1/10 of the transmission time), the transmission segment theoretically allows up to 10 transponders to be processed.

The formal factor of the radar interrogators being 1/10, the invention theoretically allows "contemporary" operation for up to 10 radar systems.

The equivalent in distance of the duration Tm of a bit of pseudo-random code is c·Tm/2, c being the speed of light, that is 20 m. The distance range which can be analysed is 15 times greater, that is 300 m. The ambiguity of distance is connected to the period of the pseudo-random code, or to its number of bits, that is 1000×20 m=20 km.

In fact, it is known that time shifts of a pseudo-random code having accuracy better than the duration of a bit can be detected. In the present case, the accuracy can reach 5 m.

Each radar system can be allocated a different pseudo-random code. Thus, one or several tens of different codes which are uncorrelated, that is to say cannot be deduced from one another by temporal translation, can thus be provided. Each vehicle receives one of these codes in a permanent memory (or a word generating such a code).

Figure 5:
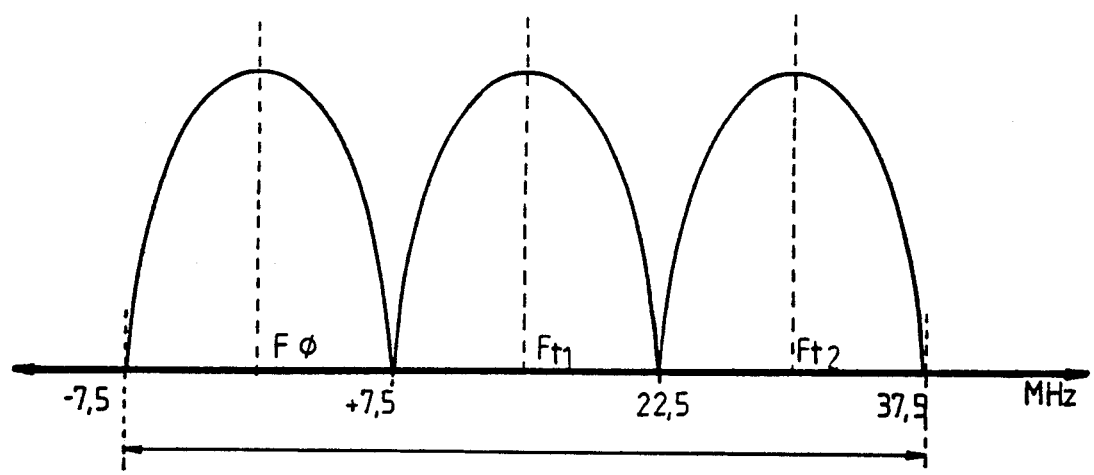
FIG. 5 shows schematically the transposition band of transponders for radar systems corresponding to the first embodiment of the device according to the invention.

Reference will now be made to FIG. 5, which shows a chronogram illustrating the operating band of the radar system and of the transponders.

The operating band of the radar system is located at around 1 gigahertz (F∅) with a bandwidth of ±7.5 megahertz.

The operating band of the individual transponders is situated around $F0+Ft_1\pm7.5$ megahertz where $Ft_1=15$ megahertz.

The operating width of the transponders carried by the vehicles is situated around $F\emptyset+Ft_2$ with a bandwidth of ±7.5 megahertz where $Ft_2=30$ megahertz.

Figure 6:
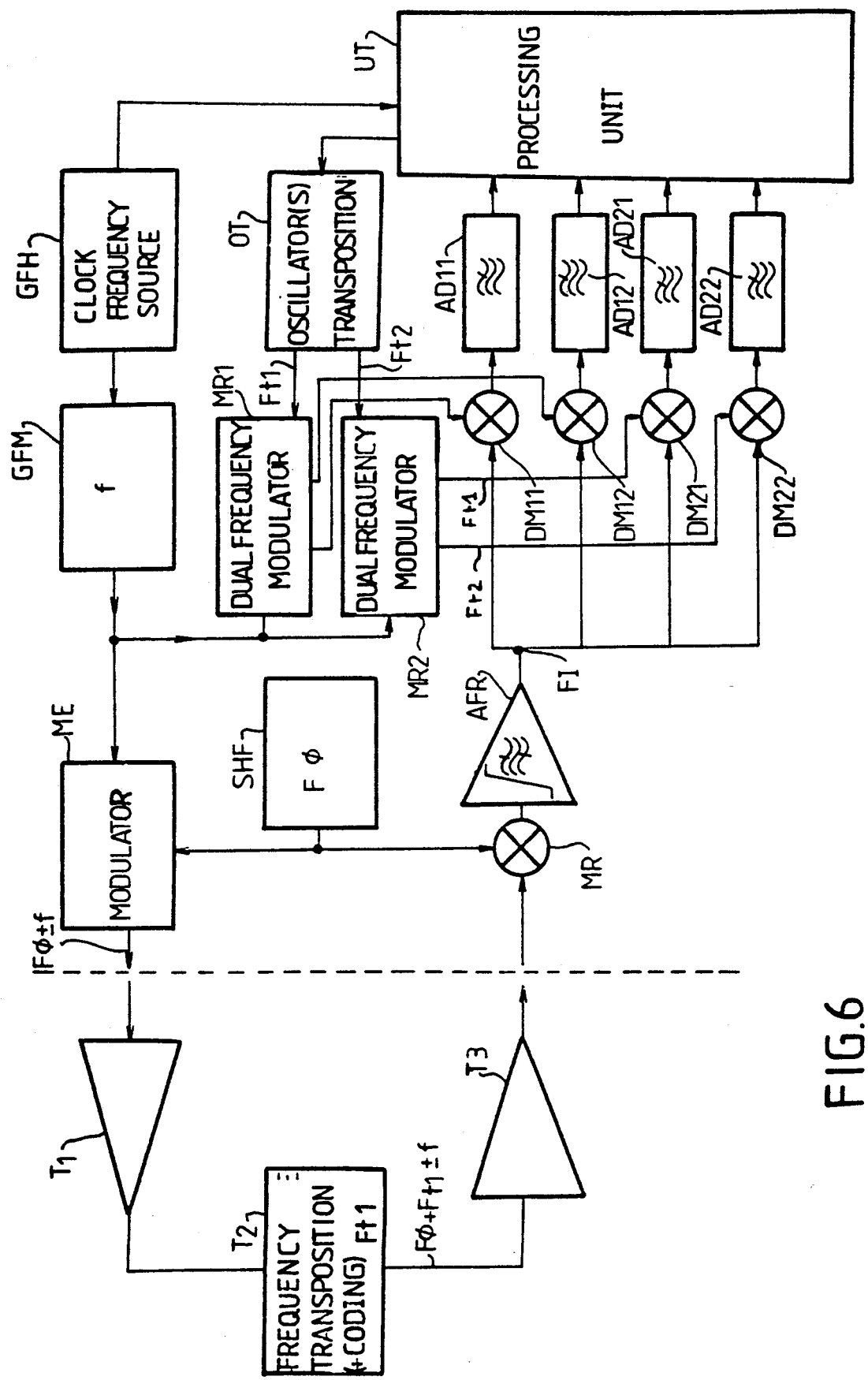
FIG. 6 shows schematically the second embodiment of the device according to the invention.

Reference will now be made to FIG. 6 and the following figures, for the description of a second embodiment of the invention.

The difference between this second embodiment and the previous one resides in the acquisition of distance information by the radar system, which is based on different principles. On the other hand, many general aspects of the invention are common to both, but it should be pointed out that the two embodiments have their own advantages.

FIG. 6 shows a block GFH serving to generate, from a same time reference, clocks which can be used for the digital circuits and frequency values which may be used in analog form.

This circuit GFH is connected to a modulation frequency generator GFM of which the output will be a frequency signal f of a basically sinusoidal shape.

As before, the hyperfrequency source SHF supplies the frequency F∅. This frequency is applied to a transmission modulator ME which also receives the so called modulation frequency f. Therefore, the output of the modulator ME finally supplies, as transmitted signal, a frequency F∅±f. That is to say that the transmitted wave will be composed of two lines F1 and F2 of which the frequencies will be F∅+f and F∅−f respectively.

This signal is conditional on total suppression of the carrier F∅ at the output of the modulator ME.

The transponder can have exactly the same construction as in FIG. 3 except possibly for the adjustments in the filtration bandwidths and in the transposition frequency value.

On reception, the on-board radar system of the vehicle receives, via an antenna (not shown), possible reflected echoes which are theoretically at a frequency $F\emptyset \pm f + Ft_1$, $Ft_1$ designating a transposition frequency value of a transponder.

In the first instance, a mixer MR receiving F0 as local signal will supply at its output a frequency of the form $Ft_1 \pm f$ and other lines which will be filtered by an amplifier AFR. The output of this amplifier AFR is therefore a signal FI having only the component $Ft_1 \pm f$.

The circuit also comprises an auxiliary oscillator OT capable of supplying the transposition frequency value $Ft_1$ which has just been examined as well as one or more other transposition frequency values such as $Ft_2$.

Two bi-frequency modulators MR1 and MR2 will thus modulate these frequencies $Ft_1$ and $Ft_2$ via the output f Of the generator GFM in the same way as was done for the transmission modulator ME, but at a much lower power.

The outputs of the modulators MR1 and MR2 will therefore be local signals having the form $Ft_1 \pm f$, and $Ft_2 \pm f$, respectively.

Concentrating for the moment on the first signal $Ft_1 \pm f$, of which the two lines are available on two separate paths applied respectively to the mixers DM11 and DM12. These mixers will therefore carry out synchronous demodulation of the signal FI which has the precise form $Ft_1 \pm f$ (apart from the Doppler effect and the transposition frequency distribution).

The outputs of these two mixers are therefore low frequency signals which can be filtered in respective low-pass filters AD11 and AD12 (having a band of about 7.5 kHz, for example).

After this, the processing unit UT will measure the phase difference between the two paths.

It is commonly known in the art that this phase difference depends on the distance.

Everything happens exactly the same in the second path, with the mixers DM21 and DM22 receiving the components $Ft_2 \pm f$ of the modulator MR2 and followed respectively by the low-pass filters AD21 and AD22.

The apparatus is therefore capable of determining the distance of any transponder which returns a transposed signal to it.

In the first embodiment, the use of pseudo-random sequences or codes inevitably resulted in spectral dispersion which made it necessary completely to divide the entire working width between all the radar systems and transponders.

The second embodiment utilises a more interesting variation which reduces the risks of interference, on the assumption that two radar systems or two transponders will react simultaneously.

Figure 7:
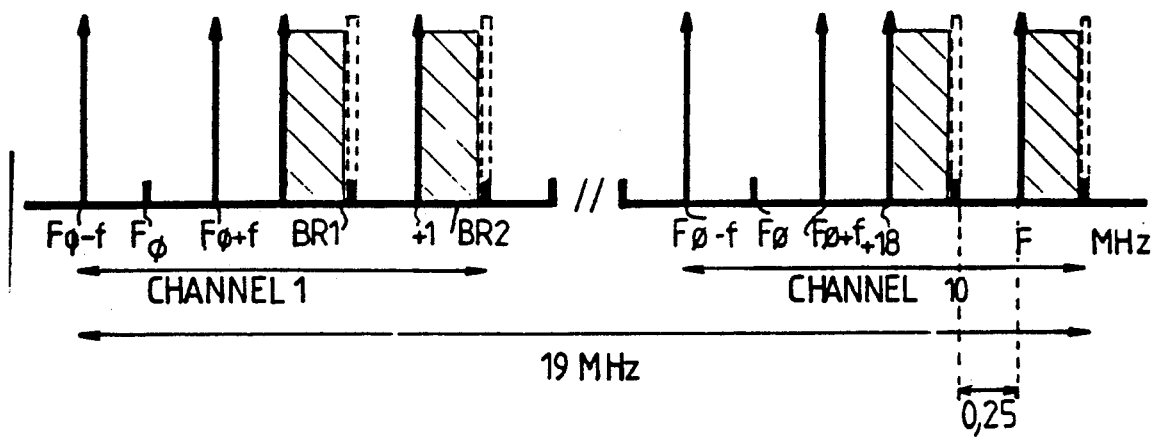
FIG. 7 shows the transposition band of the transponders for radar systems corresponding to the second embodiment of the device according to the invention.

This variation is illustrated in FIG. 7 which shows that the working width or "total range" extends over 19 megahertz. However, this is divided, for example, into 10 channels each forming 1.9 megahertz. A particular value of the basic frequency $F\emptyset$ is defined in each channel, whereas f is the same for all. The two lines transmitted by a radar system utilising this sub-band or "channel 1" can be seen in $F\emptyset - f$ and in $F0 + f$. The frequency bands utilised by the transponders operating at the transposition frequency $Ft_1$ are shown at BR1 and BR2. The spectrum can obviously be extended to other transposition frequencies.

This can be repeated in the same manner on the 10 channels used, by mere translation of frequency.

The advantage is that 10 transmission frequencies (or more) are available for the radar systems. When two vehicle radar systems are sufficiently close, and they happen to transmit at the same time, the risk of interference between their transmissions is substantially diminished in the ratio of the number of channels cut into the total operating range.

In practice, the basic frequency $F\emptyset$ has a value of the order of 1 gigahertz while f has a value of 250 kilohertz. The transposition frequencies $Ft_1$ and $Ft_2$ have, for example, 1 megahertz and 2 megahertz as value, respectively.

Thus, 50 transponder sub-channels, spaced by 10 kHz, can be placed inside the same transmission channel.

In FIG. 6, the selectivity with regard to these sub-channels is achieved in the region of the processing unit UT, the frequency being recognised by rapid Fourier transform.

In principle, a single value of f is used over the entire operating band. If it is accepted that the radar systems are not of a standard model, it is possible to use different values of f, at a rate of one per radar system, providing that the digital processing rhythms are multiples of f.

Furthermore, the same radar system can utilise f and different multiple values of f to adjust its distance sensitivity as a function of the surroundings.

Other aspects of these questions relating to interference between radar systems and/or transponders will be dealt with hereinafter.

A different aspect of the invention concerning the mode of operation of the aerials which they use will now be considered.

The aerial used for a transponder will basically be a single aerial, such as a whip antenna, connected to a duplexer to allow reception as well as re-transmission.

Several arrangements are possible in the sphere of vehicle radar systems, which can also be called "interrogators".

In a simple embodiment of the invention, it can be considered that the risk of collisions encountered by a vehicle is essentially located at the front. It is therefore sufficient for the interrogator to have a single, directional antenna which is essentially sensitive to what is happening in front and is associated with a duplexer which allows it to transmit as well as receive.

A more highly developed version of the invention will make use of an antenna system allowing angular detection, preferably in the manner of interferometry.

Two aerials, placed at the front and rear of the interrogating vehicle respectively, and having, for example, an opening angle of the order of 120°, which are symmetrical about a longitudinal axis of the vehicle will therefore be provided.

This range allows a responding vehicle located 250 m from an intersection of perpendicular roads to be detected, for a maximum analysis distance of 300 m (as the limit of the angular range, that is to say for an angle of incidence of about 60° relative to the axis of the vehicle).

For homogeneity with the measurement of distance, it is desirable for the angular precision to be of the order of 5 m at the maximum analysis distance of 300 m, corresponding to an accuracy of about 1° of angle.

Assuming that a conventional Cassegrain antenna operating in the "monopulse" processing mode is used, the antenna lobe required would be about 10°, that is a dimension of the order of 2 m in the relative bearing plane.

It is obvious that this dimension is virtually prohibitive on board a vehicle, particularly since the angular coverage of 120° would necessitate angular scanning.

It is therefore preferable to use a network of elementary sources having a wide diagram (120°) to carry out interferometry in the relative bearing plane.

For this purpose, one transmission antenna and three receiving antennae or sources will be used for each illuminated zone having a relative bearing dimension of 120°, in front as well as behind the vehicle.

Figure 8A:
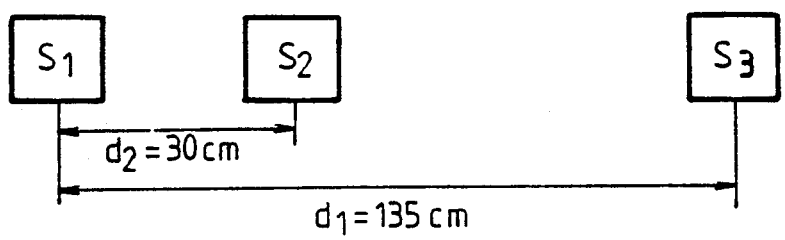
FIG. 8a and 8b shows schematically the arrangements of the receiving sources according to the invention.

The three sources S1, S2 and S3 can be aligned and can be separated, for example, by 135 cm in the case of the furthest ones, the third source being situated between them, at a distance of 30 cm from one of them (FIG. 8A).

The source S1 will serve, for example, as a reference, while the sources or aerials S2 and S3 will serve for carrying out calculations which will allow interferometry.

Figure 9:
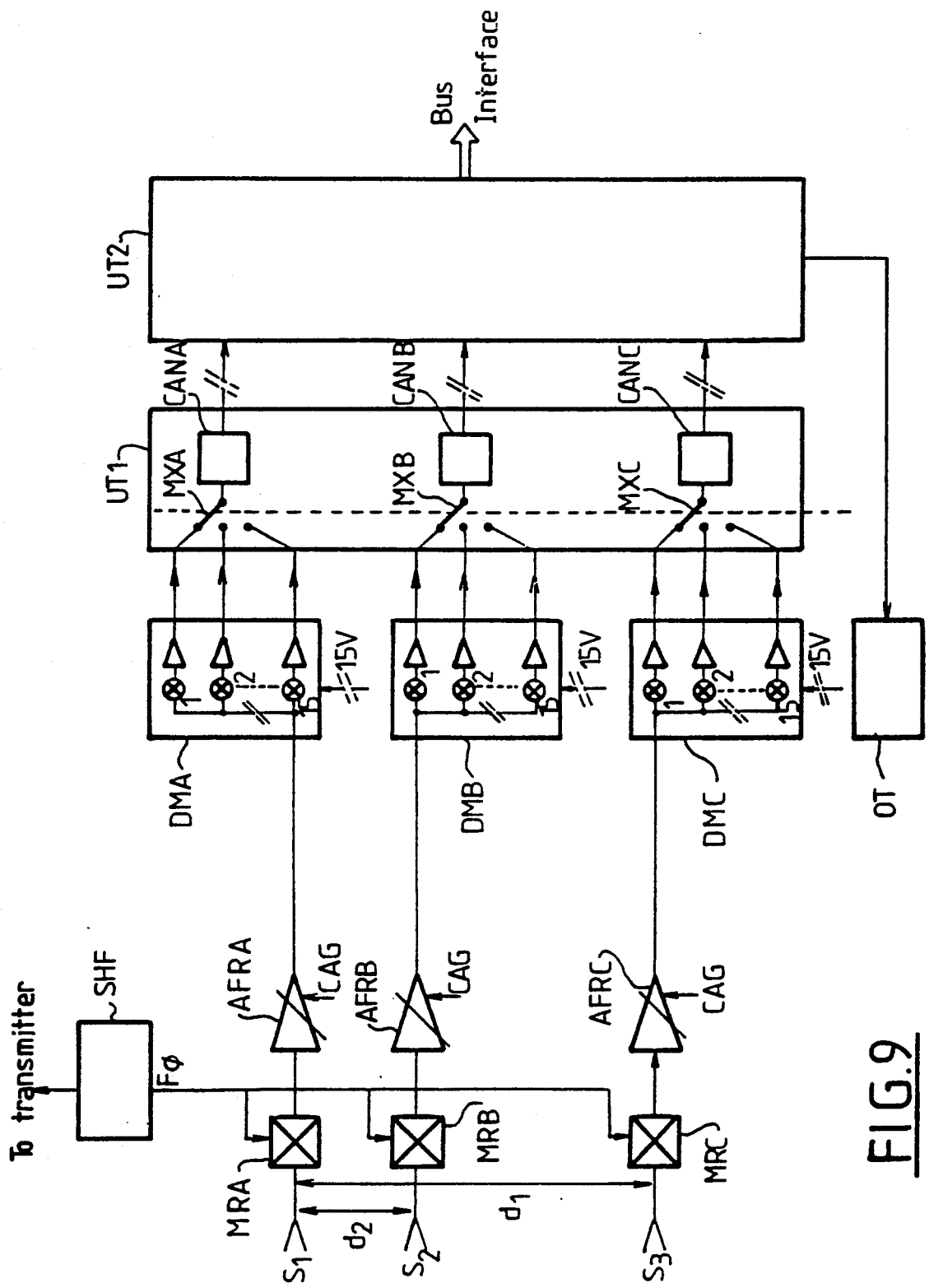
FIG. 9 shows a detailed diagram of the receiver of one or other of the embodiments of the device according to the invention.

FIG. 9 therefore illustrates the detailed diagram of the receiver of one or other of the foregoing embodiments which is modified for carrying out interferometry.

The receiving mixer MR shown in FIG. 3 or FIG. 6 is now sub-divided into three mixers MRA, MRB and MRC receiving the same transmission source SHF at the frequency F$\emptyset$ and connected respectively to three receiving antennae S1, S2 and S3.

These mixers are followed by amplifiers AFRA, AFRB and AFRC respectively. These are again shown in FIG. 3 or FIG. 6. Each of these amplifers is provided with automatic gain control.

Next there are found the demodulation blocks DMA, DMB and DMC, respectively, which receive the transposition oscillator frequency OT or OMI, for example on 15 different paths.

In this region, the representation is linked more specifically to the embodiment in FIG. 3. It is in fact known that pseudo-random sequence demodulation necessitates the arrangement of a significant number of shifted sequences which could be compared individually, simultaneously or sequentially, to the pseudo-random sequence carried by the corresponding receiving path. In the present case, analysis is carried out over 15 simultaneous paths, in each of the demodulators DMA, DMB and DMC.

If the same principle is to be applied to the demodulators in FIG. 6, two sub-paths should be used in the path S1 to allow for the existence of two frequencies having the form $Ft_1 \pm f$. The two other paths S2 and S3 can take into consideration only one of the frequencies $Ft_1 \pm f$.

After this, the outputs of the demodulators DMA to DMC are applied respectively to the corresponding digitization paths included in a data acquisition block UT1 which is essentially made up of multiplexers MXA, MXB and MXC followed by analog/digital converters CANA, CANB and CANC.

The output of these converters, expressed, for example, in 8 bits, is finally applied to the actual digital processing block UT2 which can be connected to an interface bus for the processing of the data by an on-board computer.

Figure 8B:
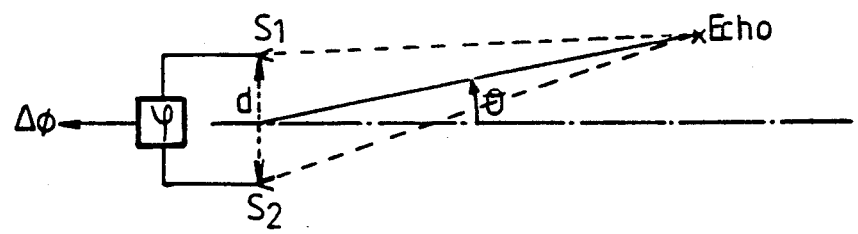

Reference is now made to FIG. 8B which shows two of the receiving antennae used, for example S1 and S2. The delta phi electrical phase shift between these two paths is given by the accompanying formula (I) in which d designates the distance of the transponder, lambda the transmission wavelength (theoretically at the basic frequency F0) and delta the half angle at the vertex of the cone, according to which the transponder sees the two sources S1 and S2.

Insofar as the d/lambda ratio is much higher than unity, this delta phi phase shift can carry out several turns over the entire distance analysis domain. There is therefore ambiguity in the delta phi value, as revealed by examination of the accompanying formula (II) in which N is an integer representing an ambiguity coefficient and alpha the actual angular measurement.

Use of a third receiving antenna allows this ambiguity to be removed insofar as two couples having values of the coefficient of ambiguity N1 and N2 which are prime numbers can be defined with the three antennae.

Now concentrating on a different aspect of the invention which is linked to the use of transponders connected to radar interrogators.

It is well known in the art knows that an electromagnetic system utilising interrogators and transponders is subject to saturation, that is to say that the number of analysable transponders has an upper limit.

In the present case, this upper limit should obviously be compatible with the problem posed, in view of the fact that this is particularly sensitive.

Various means can be used for this purpose.

The first means, which has already been described, involves proceeding autonomously, that is to say asynchronously, such that the interrogators only operate for a proportion of the time (semi-continuous transmission), for example for 1/10 of the time in the first embodiment of the invention or ⅓ of the time in the second embodiment of the invention.

A further means involves proceeding such that the transponders also carry out semi-continuous re-transmission with, for example, a form factor of 1/10 of the time in the first embodiment of the invention and in the second.

In the first embodiment of the invention, the use of various different pseudo-random codes, which cannot be deduced from one another by temporal translation, again allows the risk of saturation to be divided by a factor which is linked to the number of these codes. This number could be selected, for example, at 10.

In the second embodiment, it has already been stated that the interrogators can operate over different transmission channels, for example 10 channels. Here again, the risk of saturation is divided by a factor of 10.

The use of these means allows the risk of saturation to be reduced considerably.

In the first embodiment, the probability of the presence of two identical transponders can thus be estimated as follows:

The repetition period of the interrogator Pr is defined by the product of the necessary transmission time Te by the formal factor at interrogation Fi. Fi is equal to 0.1. Te is equal to the duration of the cycle of code Tm, for example 0.133 ms multiplied by the number of distance gates to be analysed, for example 15, and multiplied in turn by the formal factor of the transponder, for example 1/10. As a result, Te is equal to 20 ms.

The repetition period of the interrogator Tr is therefore established at 200 ms.

And the probability of the presence P of two identical transponders is equal to the formal factor Fi at transmission 1/10 multiplied by the formal factor Fr on reception 1/10, multiplied by the reciprocal of number of distance gates to be analysed, that is 1/15, the estimable result being of the order of $6.6 \cdot 10^{-4}$.

In practice, it is assumed that the probability of the presence of two identical transponders is between $10^{-3}$ and $10^{-5}$.

For the second embodiment of the invention, analog computation yields substantially the same result.

The transmission time of the interrogator Te is defined, in this case, by the product of the reciprocal of the final analysis band (this reciprocal being equal to 0.133 ms) multiplied by the number of sub-channels of the transponders which is 50 and their formal factor which is 1/10. The frequency deviation between two sub-channels is 10 kilohertz so as to cover the frequency deviation between the two lines $F\emptyset+f$ and $F\emptyset-f$.

The transmission time is therefore 66.6 ms.

As the interrogation formal factor is ⅓, the same value of 200 ms as before will be found as repetition period of the interrogator Pr.

Similarly, the probability of the presence P is obtained by the product of Fi by Fr and by the reciprocal of number of sub-channels, yielding the same theoretical value as before.

The foregoing explains the words "semi-continuous" transmission and "semi-continuous re-transmission", as used in the present description. In fact, they refer to the activity of the radar transmitter or the transponder re-transmitter which is only effective for a fraction of the time.

On the assumption that a radar transmission wave form which is itself modulated by all or nothing is used, these concepts of semi-continuous transmission or re-transmission would obviously apply just as well. The wave form would only exist for the semi-continuous transmission times.

Furthermore, this semi-continuous side is advantageously defined asynchronously. However, this asynchronous character can be moderated.

Thus, complementary measurements could allow the risk and/or the effects of two simultaneous re-transmissions of transponders to be further diminished substantially.

For example, the transponder of a vehicle could be prevented from re-transmitting during the transmission of the radar from the same vehicle.

Similarly, a radar transmission could be interrupted in the event of interference which is not soluble at reception.

And again, if the re-transmitter of a transponder operates semi-continuously, its receiver could, on the other hand, operate continuously, at least while such a transponder is associated with a vehicle. In this case, the receiving part of the transponder can be used to find out whether a radar system is already transmitting in an interfering band at the moment when the vehicle radar system under consideration is itself preparing to transmit.

In view of the foregoing, the invention essentially allows the distance (or alternatively the angle) of an object to be determined relative to an on-board interrogator of a vehicle in either of the two embodiments. This object can be stationary (for example a beacon located at the side of the road or at a junction). It can move slowly, like a pedestrian It can also be another vehicle.

With regard to at least a proportion of the transponders, that is to say of the categories of objects under consideration which are basically associated with the transposition frequencies which distinguish them, it may be worth transmitting additional information. This applies, in particular, to vehicles and it will now be assumed that this information is transmitted only in the case of vehicles, although it may also be of interest in the case of beacons.

The information transmitted in this way will be, for example, the speed of the vehicle and the course of the vehicle, and these first two details can be defined in digital form with high resolution.

The information can also relate to various instructions such as deceleration or again change of direction, in which case the information transmitted can be more qualitative.

For example, it may be desirable to indicate whether deceleration is slight, average, pronounced or ultra-pronounced (emergency stop).

The information concerning the change of direction could also have only four values:

pitch of change of direction,
turn to the left,
turn to the right,
mere change of lane in the traffic, to which synchronisation information should be added.

With the constraints linked with the operating band defined above, it is possible that all this information can be transmitted in the form of 32-bit words. A larger capacity may be contemplated, in particular if more highly developed messages are to be transmitted, whether in the case of vehicles, beacons, or other stationary objects which are not necessarily linked to the traffic.

Since the modulation utilised for the basic operation of the invention is phase modulation, it would theoretically be possible to transmit this information in the form of amplitude modulation. However, in view of the electromagnetic conditions normally encountered in vehicles, it is preferable for this information to be transmitted in the form of phase modulation which is slow or even very slow in comparison to the changes of phase angle detected for measuring distances.

Thus, the transponder could operate by modulating its transposition frequency in a range of a few kilohertz, which is smaller than the bandwidth of final analysis of the interrogator receiver (fixed higher at 7.5 kHz) and greater than the maximum range of the Doppler which could be encountered and which could be estimated at about 1.5 kHz, for example, for the above-mentioned frequency values.

In this case, it is sufficient for the processing units in the preceding figures merely to detect this slow modulation in addition to carrying out distance analysis.

An additional advantage of the use of phase modulation not only for distance measurement but also for transmitting this type of information is that it is thus possible to associate the complementary information received directly with the transponders located at the distance which has just been analysed.

The first embodiment of the invention has the following advantages.

The time sensitivity of the device is determined by a pseudo-random code of which the frequency can be varied with a view to modifying said sensitivity.

The technique based on a pseudo-random code is fairly insensitive to parasites.

The pseudo-random code is itself selective, that is to say it allows the ambiguity of distance found in transponders spaced by a distance which is a multiple of the radar range (300 meters here) to be removed.

The second embodiment of the invention has the following advantages.

The technique based on dual frequency modulation is simpler and less expensive than that based on a pseudo-random code requiring a correlator which is generally expensive.

The operating band of the radar system is narrower than that of the radar system operating according to a pseudo-random code.

The invention is obviously not limited to the embodiments described but extends to any variation falling within the scope of the following claims.

ANNEXE $$\Delta\phi = \frac{2\pi d}{\lambda} \sin\theta \quad (I)$$

$$\Delta\phi = 2\pi N + \alpha \quad (II)$$

What is claimed is:

1. A method for assisting terrestrial vehicle traffic, the method including the steps of:
   a) providing, at each of a plurality of terrestrial vehicles, a respective first radar signal,
   transmitting for selected time periods a corresponding respective first radar wave lying in a first predetermined frequency band, wherein said first radar wave adapted for distance measurement over a range of several hundred meters,
   b) transponding, at each of said plurality of terrestrial vehicles, any first radar wave received within said first predetermined frequency band, through a predetermined frequency shift, into a second radar wave lying within a second predetermined frequency band,
   c) receiving, at each of said plurality of terrestrial vehicles, any such incoming second radar wave,
   comparing the same to the local first radar signal in order to measure therefrom the distance between the local vehicle and the vehicle having transponded the signal, and
   whereby a plurality of vehicles can make said distance measurements with regard to nearby other vehicles with reduced risk of interference by using the same first radar wave frequency in the same area;
   step a) further comprises the steps of: modulating said first radar signal by phase reversal according to a pseudo-random code selectively associated with the vehicle, and
   step c) further comprises the step of: correlating the incoming second radar wave with said pseudo-random code in order to measure therefrom the distance between the local vehicle and the vehicle having transponded the signal.

2. A method according to claim 1, wherein step b) includes the step of performing for time periods selected by each of said terrestrial vehicles.

3. A method according to claim 1, wherein step b) further comprises the steps of:
   b1) transponding, at certain bodies other than said vehicles, any first radar wave received within said first predetermined frequency band, through another predetermined frequency shift, into a third radar wave lying within a third predetermined frequency band, and
   step c) further comprises the step of:
   c1) receiving, at each said plurality of terrestrial vehicles, any such incoming third radar wave, and
   comparing the same to the local first radar signal in order to measure therefrom the distance between the local vehicle and the body having transponded the signal.

4. A method according to claim 3, wherein steps b1) and c1) are selectively performed by bodies belonging to different categories, with respectively different values of said another frequency shift.

5. A method according to claim 1, wherein said selected time periods of step a) are substantially larger than the time equivalent of the desired accuracy of distance.

6. A method according to claim 1, wherein step b) further comprises the step of: encoding said second radar waves, and
   step c) further comprises the step of: decoding said second radar waves.

7. A method according to claim 6, wherein said step of coding is by slow phase modulation.

8. A method according to claim 1, wherein said first predetermined frequency band is of the order of a gigahertz, with a bandwidth of at least 10 megahertz approximately for each first radar wave.

9. A method according to claim 1, wherein the step b) further comprises the step of:
   preventing re-transmission during the producing of the first radar signal from said vehicle.

10. A method according to claim 1, further comprising the step of:
    interrupting the step a) in the event of non-soluble interference at step c).

11. A method according to claim 1, wherein step a) further comprises the steps of:
    a11) generating said first radar signal,
    a12) generating said specific pseudo-random code,
    a13) modulating said first radar signal by phase reversal according to said pseudo-random code,
    a14) transmitting said first radar signal modulated in this way, and
    the step c) further comprises the steps of:
    c11) receiving said incoming second radar wave,
    c12) demodulating the echoes of said first radar signal which supplies echoes at intermediate frequency,
    c13) producing a local distance demodulation signal having at least one of the transposition frequencies, which is itself modulated so as to be shifted in time by said pseudo-random code,
    c14) demodulating the echoes at intermediate frequency by said local distance demodulation signal, and
    c15) shifting said code until a predetermined phase relationship is obtained after the second step of demodulating wherein the step of shifting represents the distance of the transponder concerned.

12. A method for assisting terrestrial vehicle traffic, the method including the steps of:
    a) producing, at each of a plurality of terrestrial vehicles, a respective first radar signal,
    transmitting for selected time periods a corresponding respective first radar wave lying in a first predetermined frequency band, wherein said first radar wave adapted for distance measurement over a range of several hundred meters,
    b) transponding, at each of said plurality of terrestrial vehicles, any first radar wave received within said first predetermined frequency band, through a predetermined frequency shift, into a second radar wave lying within a second predetermined frequency band, c) receiving, at each of said plurality of terrestrial vehicles, any such incoming second radar wave, comparing the same to the local first radar signal in order to measure therefrom the distance between the local vehicle and the vehicle having transponded the signal, and whereby a plurality of vehicles can make said distance measurements with regard to nearby other vehicles with reduced risk of interference by using the same first radar wave frequency in the same area;

step a) further comprises the step of: producing a pair of adjacent carrier waves selectively associated, and simultaneously transmitting said pair adjacent carrier waves, and the step c) further comprises the step of measuring the phase deviation between the two said incoming second radar waves in order to measure therefrom the distance between the local vehicle and the vehicle having transponded the signal.

13. A method according to claim 12, wherein the step a) further comprises the steps of:

a111) generating said pair of carrier waves, a112) generating an auxiliary frequency, a113) modulating said pair of carrier waves by the auxiliary frequency, a114) transmitting said pair of carrier waves by the auxiliary frequency, a114) transmitting said pair of carrier waves modulated in this way, c111) receiving said incoming second radar waves, wherein c112) the first demodulation of these echoes by said pair of carrier waves supplied intermediate frequency echoes, c113) producing two local distance demodulation signals, each having at least one of the transposition frequencies being themselves modulated by the auxiliary frequency, c114) separating the second demodulation, c115) filtrating the signals obtained after the second demodulation, wherein said signals are representative of the distance concerned.

14. A system mounted in at least one terrestrial vehicle, said system comprising:

a radar for producing a respective first radar signal, said radar including means for transmitting, during selected time periods, a corresponding respective first radar wave lying in a first predetermined frequency band, means for adapting said first radar wave for distance measurement over a range of several hundred meters, a transponder for transponding any first radar wave received within said first predetermined frequency band, through a predetermined frequency shift, into a second radar wave lying within a second predetermined frequency band, means for receiving any such incoming second radar wave, means for comparing the same to the local first radar signal, and means for measuring therefrom the distance between a local vehicle and a remote vehicle having transponded the signal, whereby a larger number of vehicles having said system can make said distance measurements with regard to nearby other vehicles having said system with reduced risk of interference by using the same first radar wave frequency in the same area;

at least one remote transponder positioned remote from said at least one vehicle, said remote transponder for transporting any first radar wave received within said first predetermined frequency band, through another predetermined frequency shift, into a third radar wave lying within a third predetermined frequency band, said system receiving any such incoming third radar wave, and comparing the same to the local first radar signal in order to measure therefrom the distance between the local vehicle and said remote positioned transponder transponding the signal.

15. A system according to claim 14, wherein said transponder includes means for re-transmitting for time periods being selected by at least one of said terrestrial vehicles.

16. A system according to claim 14, wherein each said remote transponder is allocated a specific nominal transposition frequency appropriate for identification.

17. A system according to claim 14, wherein the first radar signals transmitted by said radar are capable of distance measurement according to their phase angle over long transmission times with regard to the time equivalent of the desired accuracy of distance.

18. A system according to claim 14, wherein said transponder comprises means for encoding said second radar waves and wherein said radar comprises means for decoding said incoming encoded radar waves.

19. A system according to claim 18, wherein said coding is by slow phase modulation.

20. A system according to claim 19, wherein said coding includes at least one of the following components: nature, speed, course, acceleration or braking of the transponder carrier.

21. A system according to claim 14, wherein said first predetermined frequency band is on the order of a gigahertz, with a bandwith of at least 10 megahertz approximately for each first radar wave.

22. A system according to claim 14, wherein said transponder is omni-directional.

23. A system according to claim 14, wherein said transponder of a vehicle includes means for preventing retransmission during the transmission of said radar from the same vehicle.

24. A system according to claim 14, wherein said radar receives directionally.

25. A system according to claim 14, wherein said radar is equipped with multiple antennae which are mounted on the associated vehicle to allow for selective communication.

26. A system according to claim 14, wherein said radar includes means for interrupting transmission in the event of interference at its reception.

27. A system according to claim 14, wherein said transponder is arranged to transmit said first radar signal of which the frequency has been transposed according to single-sideband modulation.

28. A system according to claim 14, wherein said radar further comprises means for producing a respective carrier radar signal which is modulated by phase reversal according to a pseudo-random code selectively associated with the vehicle, and means for transmitting during selected time periods a corresponding respective first radar wave, and means for receiving any such incoming second radar wave with said pseudo-random code in order to measure therefrom the distance between the local vehicle and the remote vehicle having transponded the signal.

29. A system according to claim 28, wherein said radar comprises:

means for generating said carrier radar signal, means for generating said specific pseudo-random code of said radar, a modulator for modulating said carrier radar signal by phase reversal according to said pseudo-random code, means for transmitting said carrier radar signal modulated in this way, means for receiving incoming second radar waves, a first demodulator for demodulating the echoes from said carrier radar signal into intermediate frequency, a generator for generating local distance demodulation signal, said signal having at least one of the transposition frequencies of the transponders, wherein the transposition frequencies being so as to be shifted in time by said pseudo random code, a second demodulator for demodulating the echoes at intermediate frequency by utilizing said local distance demodulation signal, and means for shifting said code until a predetermined phase relationship is obtained after the second demodulation, wherein the shift being representative of the distance of the transponder concerned.

30. A system according to claim 14, wherein said radar comprises means for producing a pair of adjacent carrier waves selectively associated, means for simultaneously transmitting said pair of adjacent carrier waves, means for receiving any such incoming second radar wave, and means for measuring the phase deviation between the pair of said incoming second radar waves in order to measure therefrom the distance between the local vehicle and the vehicle having transponded the signal.

31. A system according to claim 30, wherein said radar comprises:

a first generator for generating said pair of adjacent carrier waves selectively associated, a second generator for generating said auxiliary frequency, a modulator for modulating said pair of adjacent carrier waves by the auxiliary frequency, means for transmitting said pair of adjacent carrier waves modulated in this way, means for receiving incoming second radar waves, a first demodulator for demodulating the echoes by said pair of adjacent carrier waves, which supplies intermediate frequency echoes, a third generator for generating two local distance demodulation signals, each local signals having at least one of the transposition frequencies of the transponders which are themselves modulated by the auxiliary frequency, a second demodulator for demodulating the echoes which are separated from the intermediate frequency echoes by said local distance demodulation signals, and means for filtering the signals obtained after the second demodulation, said signals being representative of the distance of the transponder concerned.

* * * * *